UNITED STATES PATENT OFFICE.

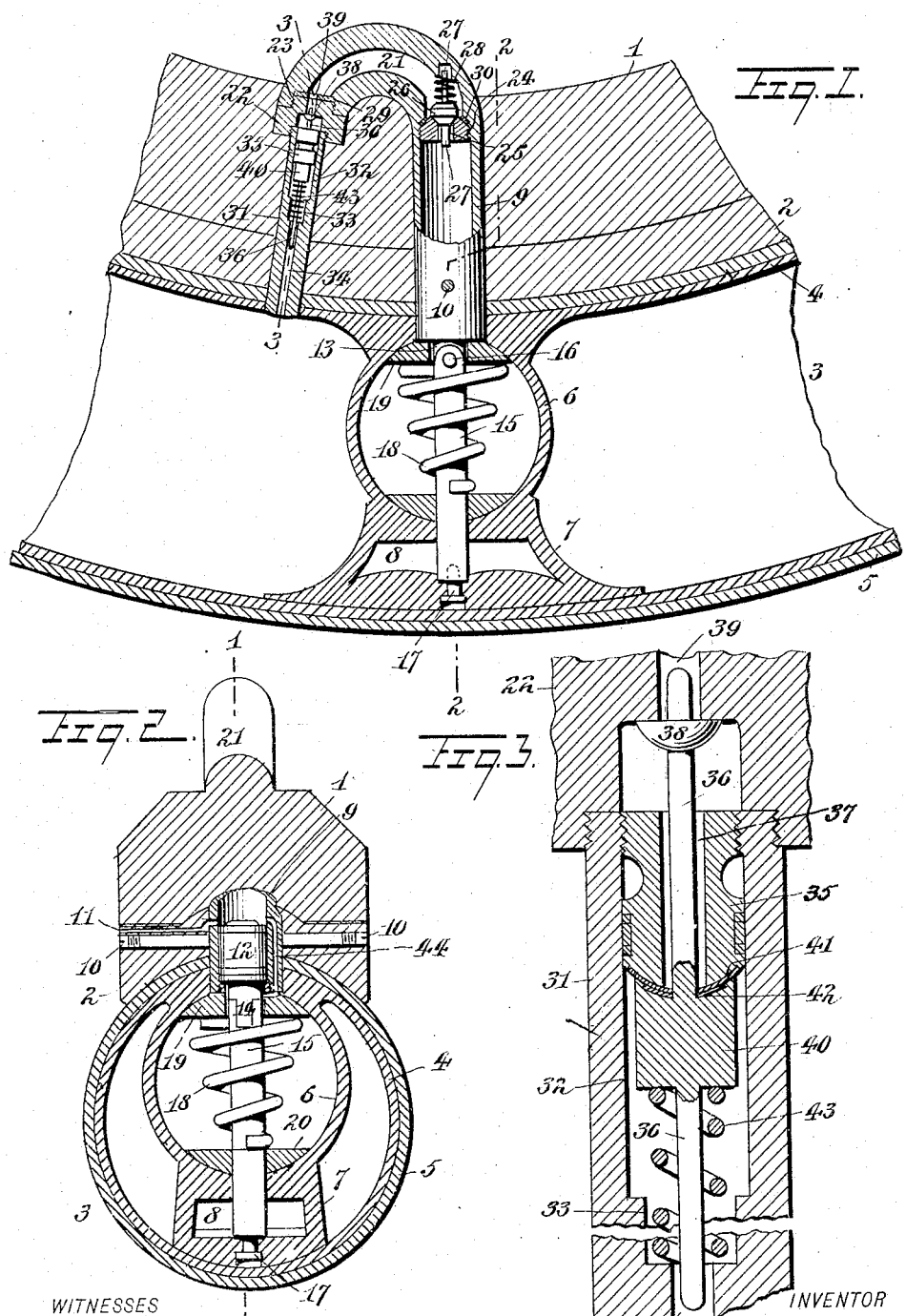

EMILE HAYNE, OF BISBEE, ARIZONA TERRITORY.

INFLATING DEVICE FOR TIRES.

939,020.   Specification of Letters Patent.   Patented Nov. 2, 1909.

Application filed August 19, 1907. Serial No. 389,259.

*To all whom it may concern:*

Be it known that I, EMILE HAYNE, a citizen of the United States, and a resident of Bisbee, in the county of Cochise, Territory of Arizona, have invented a new and Improved Inflating Device for Tires, of which the following is a full, clear, and exact description.

This invention relates to inflating devices for tires, and is particularly useful in connection with pneumatic tires such as are used on motor vehicles and the like.

An object of the invention is to provide a simple, strong and efficient inflating device for pneumatic tires, which is automatic in operation and which obviates the necessity for manually or otherwise extraneously inflating a tire.

A further object of the invention is to provide a device of the class described having a movable member arranged within a pneumatic tire, and operable to compress air and to force the same into the tire by the successive radial movements of the tire at one point thereof, due to the successive compressions of the tire at that point as the wheel rolls upon the ground.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a section on the line 1—1 of Fig. 2, and shows a portion of a vehicle wheel and a tire, with my invention applied thereto and represented partially in section and having a part broken away; Fig. 2 is a section on the line 2—2 of Fig. 1; and Fig. 3 is an enlarged section on the line 3—3 of Fig. 1.

Before proceeding to a more detailed explanation of my invention it should be clearly understood that the inflating device is absolutely automatic in its operation and is controlled by the radial, compressive movements of the tire as the latter travels upon the ground. As the tire travels along the ground, at the momentary point of contact with the latter it is compressed to a certain degree, depending upon the weight supported by the wheel and upon the degree of compression of the air or other fluid medium within the tire.

My invention comprises essentially, a casing having a plunger controlled by a movable member arranged radially or transversely of the tire. As the portion of the tire at which the device is located is compressed the movable member is actuated and operates the plunger longitudinally of the casing, thereby compressing the air within the casing and forcing it through suitably valved passages, to the tire. The valves between the casing and the inlet opening to the tire are arranged to operate in one direction only, so that while the air can be forced into the tire, none can escape therefrom through the inlet passage. I prefer to employ a small reservoir intermediate of the casing and the inlet of the tire, to insure uniformity of flow of the air into the tire.

When the tire is fully inflated, the compression due to the weight of the vehicle is comparatively slight and consequently the operation of the movable member, which depends upon the compression of the tire, will be correspondingly slight and little or no air will be forced into the tire. When the tire is wholly or partly deflated, however, the movement of the operating parts will be correspondingly greater and the tire will be rapidly inflated by the operation of the air pump constituted by the casing, the plunger and the movable member. I employ a spring or other resilient means to assist in returning the movable parts to the normal or inoperative position, in case the resiliency of the tire should be insufficient for this purpose after the compression due to the momentary contact of that particular point of the tire with the ground, has passed.

Referring more particularly to the drawings, 1 represents the felly of a vehicle wheel such as that of a motor carriage. A rim 2 for holding the tire in position, is mounted upon the felly 1. A tire 3, consisting preferably of an inner tube 4 and an outer shoe 5, is carried by the rim and can be mounted in position thereupon in any suitable manner. It will be understood that the vehicle wheel, as well as the tire, may be fashioned from any suitable material and may be of any common or preferred form. I provide a chamber 6 within the inner tube 4, preferably spherical in form and integral with the inner tube. The chamber 6 can be fashioned from the same material as the inner tube, such for instance, as rubber. The chamber 6 is arranged adjacent to the inner side of the tube 4, and has an integral foot 7 extending toward the outer side of the tube 4 and engaging the same. The foot 7 has outwardly disposed edges, and presents a chamber or hollow 8 therewithin to increase its resiliency and decrease the weight and the material necessary therefor. A cylindrical casing 9 is mounted in suitable radial openings of the felly and the rim, and extends through registering openings of the shoe and the inner tube to the chamber 6, communicating interiorly therewith. The casing 9 is mounted in position by means of screw studs 10 located in transverse openings of the rim 2. A passage 11 formed in the rim 2 effects communication between the interior of the casing 9 and the outer air.

A movable piston or plunger 12 is slidably arranged within the casing 9, and has a stem 13 presenting a constricted extremity 14. A movable member or plunger rod 15 is located within the chamber 6 and has a bifurcated end pivotally mounted by means of a pin 16 at the constricted extremity 14 of the stem 13. The movable member passes through suitable openings of the chamber and the foot 7, to a point adjacent to the outer wall of the tube 4 and presents a head 17 adapted to engage the tube when the tire is compressed. As the wheel rolls along the ground, the tire is successively compressed in a radial direction. As the portion of the tire adjacent to the inflating device is compressed the member 15 is moved toward the casing 9, thereby forcing the plunger longitudinally of the casing. The casing is filled with air which enters through the passage 11. As the plunger advances within the casing it closes the opening of the passage 11 and thereby the air within the casing is compressed by the plunger and is forced from the same, as will appear hereinafter.

A helical spring 18 is arranged upon the member 15 and engages seats 19 and 20 at opposite sides of the chamber, respectively. When the tire has advanced to a point where the portion adjacent to the inflating device is no longer under compression, the natural resiliency of the tire aided by the spring 18 causes the tire to assume the normal form, whereby the movable member is returned to the normal position, as shown in Figs. 1 and 2. When the member 15 is in the normal position the plunger 12 is similarly arranged within the casing with the passage 11 uncovered, to permit the air again to enter the casing.

The casing 9 extends beyond the inner side of the felly 1 and is curved upon itself to form a reservoir 21 having a head 22. The head 22 has a constricted, threaded portion 23, mounted in a correspondingly threaded recess at the extremity of the reservoir 21 and arranged within an opening of the felly. The reservoir 21, which constitutes, primarily, a passage, is separated from the remainder of the casing 9 by means of a threaded valve-seat 24, mounted in a suitably threaded neck of the casing. A valve opening 25 is formed in the valve-seat, and is normally closed by means of a valve 26 having a stem 27 and controlled by a helical spring 28 upon the stem 27. The spring 28 holds the valve normally in the closed position upon the valve-seat 24. I provide washers 29 and 30 at the head 23 and the valve-seat 24 respectively, to insure an air-tight fitting of the parts.

A conduit 31 preferably of tubular form, has a threaded end mounted at a corresponding recess of the head 22, and effects communication through suitable openings of the felly rim and the tire between the reservoir 21 and the interior of the inner tube. The conduit 31 has successive, constricted passages 32, 33, and 34 therethrough. A valve-seat 35, is arranged within the passage 32 of the conduit 31, and is mounted in position by the engagement of a threaded part with a correspondingly threaded part of the passage. A valve stem 36 is located within the conduit and passes through a suitable opening 37 of the valve seat 35. The stem 36 has a valve-disk 38, normally closing an opening 39 through the head 23. At the side of the valve-seat remote from the valve-disk the stem has an integral extended part 40, presenting a rounded shoulder normally engaging the correspondingly rounded adjacent side of the valve-seat. Annular disks or washers 41 and 42, are carried by the valve-seat and the extended part 40 respectively, to insure the air-tight seating of the latter against the valve seat. A helical spring 43, is loosely mounted upon the stem 36 at the side of the extended part 40 remote from the valve-seat, and normally holds the valve closed. The spring 43 engages the extended part 40 of the stem and at the opposite end the shoulder formed between the passages 33 and 34.

The opening 37 through the valve-seat 35 is greater in diameter than the valve-stem 36, to permit the flow of air through the opening 37 when the valve is open. Similarly, the opening 25 of the valve-seat 24 is greater in diameter than the stem of the valve 26, to permit the flow of air when the valve is open. It will be understood that when the air is compressed by the plunger within the casing, the valve 26 is forced open and the air enters the reservoir 21. When sufficient air has been compressed in the reservoir 21 to overcome the pressure in the opposite direction, of the air in the tire, the valve between the reservoir and the tire will be opened and the air will flow from the former into the latter. As the valves are operable in one direction only, none of the air from the tire can force its way back into the casing.

I provide a passage 44, in the wall of the casing 9 between the casing and the interior of the chamber 6. Thus, as the plunger passes beyond the opening of the passage 44, communication is opened between the outer air and the interior of the chamber 6, and thus the pump does not tend to rarefy the air within the chamber and consequently, the operation of the pump is unimpeded.

Having thus described my invention I claim as new, and desire to secure by Letters Patent:—

1. The combination with a tire having a chamber therein inclosed with respect to the interior of the tire, of a casing, a plunger within said casing and movable longitudinally thereof, a movable member controlling said plunger and operable by the compression of said tire, said member extending through said chamber, a spring within said chamber and holding said member in a normal position, and a valved passage effecting communication between said casing and said tire and adapted to permit the flow of a fluid therethrough in one direction.

2. The combination with a tire having therein a separate inclosed chamber and a foot rigid with said chamber and engaging at the inside of the tread portion of the tire, of a casing communicating with the outer air, a plunger within said casing and movable longitudinally thereof, a movable member controlling said plunger and extending through said chamber to said foot, said member having a part permanently secured within said foot, said member being operable by the radial compression of said tire, a spring within said chamber for holding said movable member in a normal position, a reservoir communicating with said casing, a one-way valve between said reservoir and said casing, a conduit effecting communication between said reservoir and said tire, and a second one-way valve controlling the flow of fluid from said reservoir through said conduit.

3. In a device of the class described, in combination, a tire having a chamber therewithin, a casing adapted to be carried by a vehicle wheel and communicating with said chamber, a plunger within said casing and movable longitudinally thereof, a movable member pivoted to said plunger and extending through said chamber, said movable member extending toward the outer side of said tire and being operable by the radial compression thereof, a spring within said chamber and holding said movable member in a normal position, said casing communicating with the outer air, a reservoir communicating with said casing, a spring-held valve permitting the flow of fluid from said casing to said reservoir, a conduit adapted to be carried by a vehicle wheel and effecting communication between said reservoir and said tire, and a second spring-held valve permitting the flow of fluid from said reservoir through said conduit in one direction.

In testimony whereof I have signed my name to this specification in the presence of two subscribing witnesses.

EMILE HAYNE.

Witnesses:
 WILLIAM MARTIN,
 C. C. THOMPSON.